United States Patent
Rubin (10) Patent No.: US 11,184,971 B1
(45) Date of Patent: Nov. 23, 2021

(54) SYNCHRONIZED ILLUMINATED FASHION ACCESSORIES

(71) Applicant: Kim Rubin, Menlo Park, CA (US)

(72) Inventor: Kim Rubin, Menlo Park, CA (US)

(*) Notice: Subject to any disclaimer, the term of this patent is extended or adjusted under 35 U.S.C. 154(b) by 0 days.

(21) Appl. No.: 17/165,538

(22) Filed: Feb. 2, 2021

(51) Int. Cl.
*A61B 5/00* (2006.01)
*A61B 5/0205* (2006.01)
*H05B 47/19* (2020.01)
*H05B 47/155* (2020.01)
*A44C 15/00* (2006.01)
*A41F 9/00* (2006.01)
*A43B 3/00* (2006.01)

(52) U.S. Cl.
CPC ............ *H05B 47/19* (2020.01); *A41F 9/002* (2013.01); *A43B 3/001* (2013.01); *A44C 15/0015* (2013.01); *H05B 47/155* (2020.01)

(58) Field of Classification Search
CPC ....... H05B 47/19; H05B 47/155; A41F 9/002; A43B 3/001; A44C 15/0015
See application file for complete search history.

(56) References Cited

U.S. PATENT DOCUMENTS

| | | | | |
|---|---|---|---|---|
| 8,919,982 | B2* | 12/2014 | Pulido, Jr. | A41D 27/085 362/103 |
| 9,282,893 | B2* | 3/2016 | Longinotti-Buitoni | G06F 1/163 |
| 10,132,490 | B1* | 11/2018 | Olivero | H05B 45/20 |
| 2015/0009654 | A1* | 1/2015 | Chan | H05B 47/19 362/104 |
| 2017/0181255 | A1* | 6/2017 | Jeremy | H05B 45/00 |
| 2019/0116635 | A1* | 4/2019 | Wilson | H05B 45/22 |

* cited by examiner

*Primary Examiner* — Tracie Y Green
(74) *Attorney, Agent, or Firm* — Kim Rubin Patent Agent (57) ABSTRACT

Devices, a set of devices, and methods are described to create coordinated, or synchronized, displays of colors by worn fashion accessories, such as necklaces, earrings, shoes, belts, and the like. A master device is defined that sends broadcast, wireless commands to slave devices, which respond with colors and timing in a synchronized way, typically to enhance the experiences of the wearers. Synchronization may include simultaneous lighting, sequential lighting, the same color or coordinated colors. A group ID in messages is defined so that a first set of fashion accessories on a first group of wearers may be controlled by one master, while a nearby second set of fashion accessories worn by a second set of wearers controlled by a second master do not conflict. Operation, including changes from a standby state to an operational state is automatic, using, for example motion detection.

17 Claims, 7 Drawing Sheets
(4 of 7 Drawing Sheet(s) Filed in Color)

SYNCHRONIZED ILLUMINATED FASHION ACCESSORIES

BACKGROUND OF THE INVENTION

Some fashion accessories, such as shoes, bracelets, and hats, now include electronics and the ability to emit light, for example, children's shoes that blink colors as they walk. The control of such light is typically entirely within that fashion accessory, such as a shoe.

Prior art for communicating devices include interfaces such as Bluetooth LE and cellular.

Weaknesses of the prior art include an inability to have multiple fashion accessories emit light in a coordinated or synchronized way.

SUMMARY OF THE INVENTION

Embodiments of this invention overcome the weaknesses of prior art.

In one embodiment, a local controller, which may be a user's cell phone, smart watch, or another piece of electronics, such as inside of a bracelet or shoe, sends local wireless commands to other currently worn fashion accessories, typically by a single wearer. Such local wireless communication may be via Bluetooth LE or another protocol.

In another embodiment, there is no specific local controller, but rather the worn fashion accessories communicate on a peer-to-peer basis, or a broadcast basis, to achieve synchronization.

"Synchronization" includes multiple specific forms, such as emitting the same color light at the same time; emitting light on and off at the same time; emitting colors, color patterns, color sequences or timing in a specific pre-planned or real-time directed coordinated sequences.

For example, all currently worn fashion accessories may display yellow, and then at a later time, all display pink. As another example, all fashion accessories turn on at the same time or at offset times to create a motion effect, similar to the way traditional movie theater marquees achieve apparent motion by timing of marquee lights. As yet another example, emitted colors from the fashion accessories may be colors or exhibit timing in response to music, motion, dancing, location, ambient light, talking and the like.

In yet another embodiment, a mood of a person, the wearer or another person, is detected and used to select from a palette of options. Such mood may be detected automatically by a controller or by one or more of the fashion accessories. Non-limiting examples include: skin moisture; skin temperature; heart rate; blood pressure; oxygen level; local motion; brain waves; wearer motion type, speed of motion, repeat motions; or other physiological attributes. These attributes may be detected and used to determine mood, or a proxy for mood. Determination of a mood of one person may be communicated wirelessly to either the fashion accessories of the wearer, or another person. Such an embodiment may be used to allow one person to silently communicate, automatically, her mood to another person. Local wearer motions include total body motion such as walking; motion of particular limbs such a running, waving, shaking hands, moving head such as nodding or indicating "no", dancing, bicycling, eating, and the like.

DETAILED DESCRIPTION

Scenarios, examples, embodiments, options and figures are non-limiting.

Figure 1A:
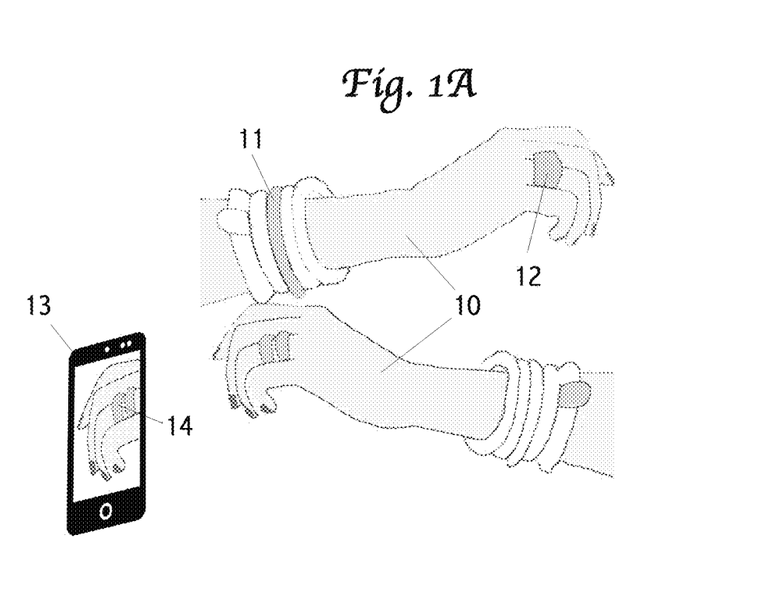
FIG. 1A shows a set of jewelry on hands and arms of one person with a first color.

Turning first to FIG. 1A we see an exemplary use. Shown are two arms 10 of a first person. She is wearing two bracelets and two rings. 11 shows a portion of one bracelet. 12 shows one ring. All four of these fashion accessories have the ability to display, either passively (e.g., by reflection) or actively (e.g., emits light such as from LEDs, OLEDs, LCD displays, etc.). Such fashion accessories may have a limited range of displayable colors which may be turned on and off. Other fashion accessories may have a larger range of displayable colors, which may be selected, blended, turned on and off, blinked, dimmed, and the like. In the figure, a piece of personal electronics 13 is used to select a color. Preset colors may be available from a fashion palette, a user may select a color from a file or a live camera display, or a user might adopt a color or sequence, or combinations, from one or more other users. 14 shows a yellow-green color selected by as user, such as on a touch screen. In general, a "user" is any person who might wear, or is wearing, one or more fashion accessories. "Device" is another name for fashion accessory. "Wearer" is another name for user.

Continuing with FIG. 1A, a selected color is sent electronically, either by a broadcast or directed transmissions, to a set of fashion accessories adapted to receive such transmissions, and then responsively display a color, a sequence, or both. Here, the user's two rings and two bracelets now display the selected yellow-green color. The color may be continuous, or it may turn on and off in a timed sequence. The various fashion accessories, here, two rings and two bracelets, display "synchronized." That is, they all display the same color at the same time. Or, they turn on and off at the same time. Or, they turn on and off in a predetermined sequence. In another embodiment, colors and sequences are not predetermined but are selected manually by a user, or adapt colors and sequences from their surroundings. For example, colors may pulse in time with dance music, or change based on lighting or time of day.

In a novel embodiment, a current mood of a user or wearer is used to select one or more colors or sequences. For example, colors may blink synchronized to a user's heart rate or breathing rate. Skin resistance, temperature, pH, saltiness, or other parameters of a user may be measured automatically and used to select or modify a color or sequence. Such measurements may be a reasonable proxy for, "mood." Alternatively, a user could manually select a mood, such as "happy," or "concerned." This mood would then be reflected in the colors and patterns of worn fashion accessories. If other people are nearby, they may then be able to observe the person's mood.

The fashion accessories achieve such synchronization by local wireless communication, such as Bluetooth LE or other protocols. Low power protocols are preferred. These communication interfaces may be enabled by devices only periodically in order to save power.

In one embodiment, a master controller may be used, such a piece of personal electronics. In another embodiment, the fashion accessories communicate without the need for such a single controller. A very simple user interface may be used. For example, a user may simply touch a fashion accessory to make it a master, or to enable it to receive and operate. Additional touches may select options, such as color or sequence. Variations of "touch" include multiple touches, length of a touch, pressure, swiping, and the like.

"Broadcast" protocol refers to a wireless transmission directed to a particular set, such as all devices with a particular Group ID, or to all devices configured and within range to receive such a transmission. Individual device addresses are not used in broadcasts. "Peer-to-peer" protocol indicates wireless transmission between two devices without the aid of a specific controller. "Point-to-point" transmission comprises address of two devices, where a transmitting device knows the address of the receiving device. Point-to-point transmissions go to only the designated receiving device. We prefer, but do not require, that transmissions from a local controller to local devices are broadcast. Communication from a remote device is generally point-to-point, with specific device addresses, such as a phone number or proxy. Broadcasts may include a source or group identifier, such as a Group ID; such an identifier is not required, however. For example, a local device might broadcast a message and that broadcast might be received by all devices within wireless range. Receiving devices are then able to "decide" whether to act responsively to the message. Or they may respond similarly to all valid received messages. See also the definition of "fashion accessories," below, under Definitions.

Figure 1B:
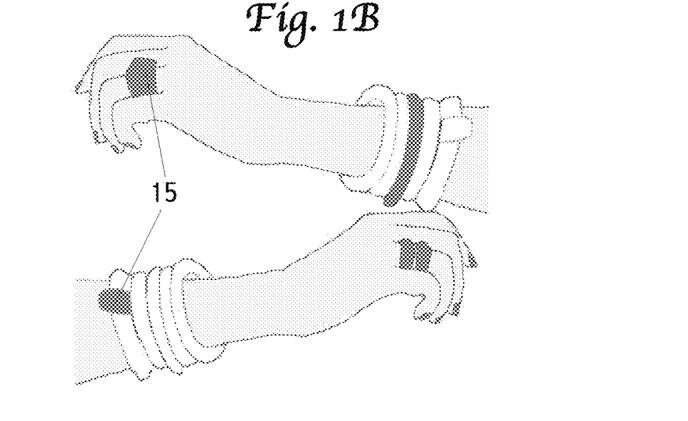
FIG. 1B shows a set of jewelry on hands and arms of one person with a second color.

Turning now to FIG. 1B, we see the same user's two arms and hands wearing the same fashion accessories as in FIG. 1A. However, their color is now red, which matches the user's fingernails. This color may be selected from a digital photograph or live camera image, such as on smart phone 13 in FIG. 1A which is displaying both a yellow-green ring and red fingernails. A user may select a desired color by touching a corresponding portion of the display, for example. In FIG. 1B, the wearer may touch or turn a ring such as 12 or 15 in order to select a color or pattern from that fashion accessory. In this example, no complex or inconvenient device such as cellphone 13 is required. In yet another embodiment, a wearer may touch a portion of a display, such as on device 13, to select a color, pattern, or sequence.

Existing local protocols may be used such as Wi-Fi or Bluetooth LE. Fashion accessories may be grouped into a particular synchronized set by existing methods of connecting devices using that protocol. However, it is advantageous in some embodiments to have a simpler or more automatic means of associating fashion accessories into an effective synchronization group. Such methods are described elsewhere herein. We sometimes refer to a Group ID as a digital number that identifies a particular fashion accessory set.

Figure 2:
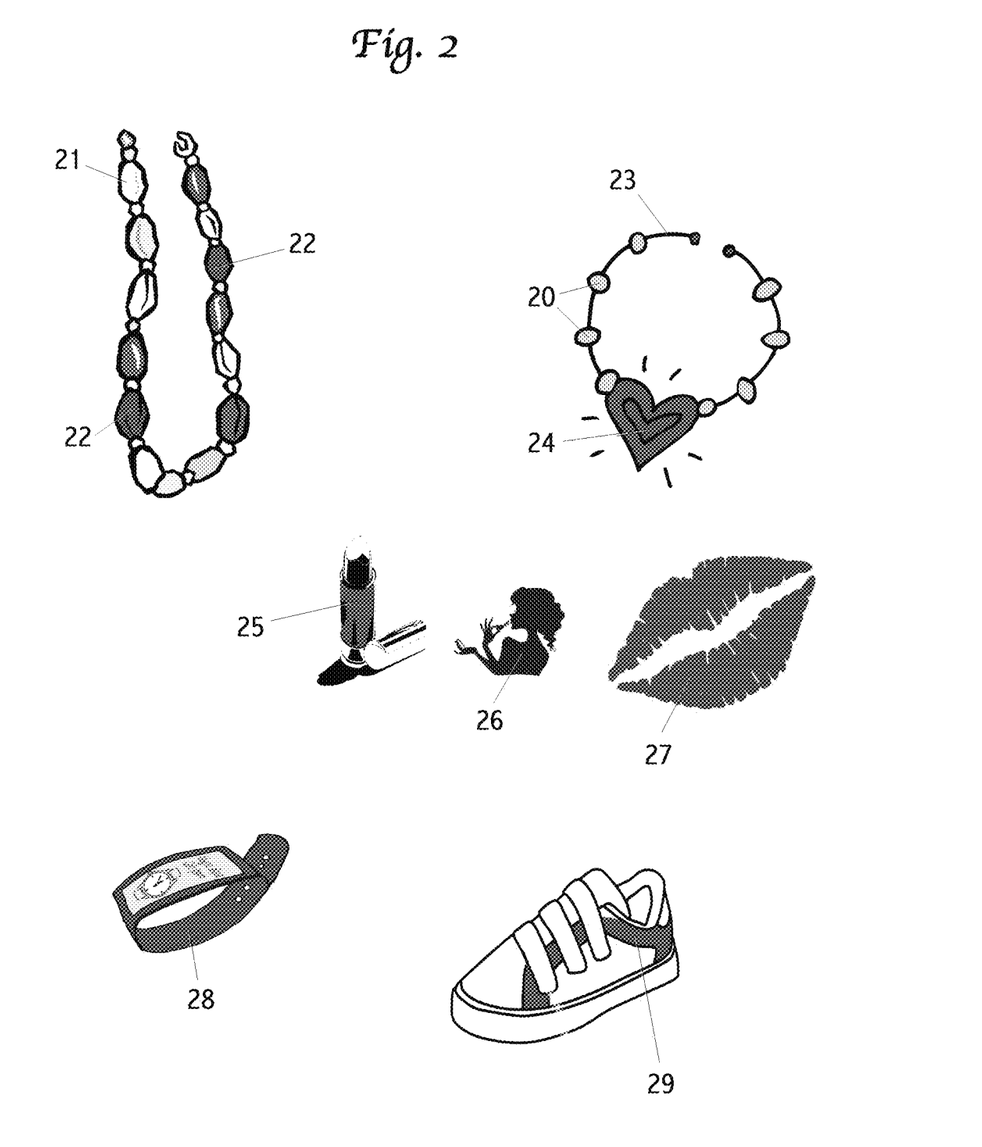
FIG. 2 shows a set of fashion accessories.

Turning now to FIG. 2, we see an exemplary set of fashion accessories. We see a necklace 21, a bracelet 23, lipstick applicator 25, a watch or wristband 28, and a shoe 29. We see in 26 a user, a woman, putting on lipstick from applicator 25. The resulting lip color is shown 27. The process of putting on lipstick with applicator 25 causes the applicator, in this example, to send a wireless message, such as a broadcast. Other fashion accessories that are ON or in STANDBY within broadcast range listen to the broadcast. Such fashion accessories that display responsively, or are going to display responsively, a synchronized color, pattern or sequence are said to be in a "group," or have the same Group ID. Group ID is any number or other electronic identifier. It may a random or otherwise arbitrary number. It may be or may be derived from a device-specific number, such as a serial number, SIM number, device address, IP address, and the like. Methods of a device selecting a Group ID are discussed below.

In FIG. 2 we see a small exemplary set out of millions of possible configurations and adaptations of fashion accessories. Necklace 21 comprises two elements, or "stones," 22, that change color and cycle on and off synchronized with other fashion accessories. Here, we see they are purple in response to a transmission by lipstick applicator 25. Bracelet 23 has a number of elements and is a member of the same Group ID as the other fashion accessories shown in the figure. It is shown blinking purple, responsive to the transmission by lipstick applicator 25. We see also a watch 28. Both the watch face and watch band are able to display different colors. Here, we see the band is purple responsive to the transmission by lipstick applicator 25. In 29 we see a shoe with a band than can change color 29.

Figure 3:
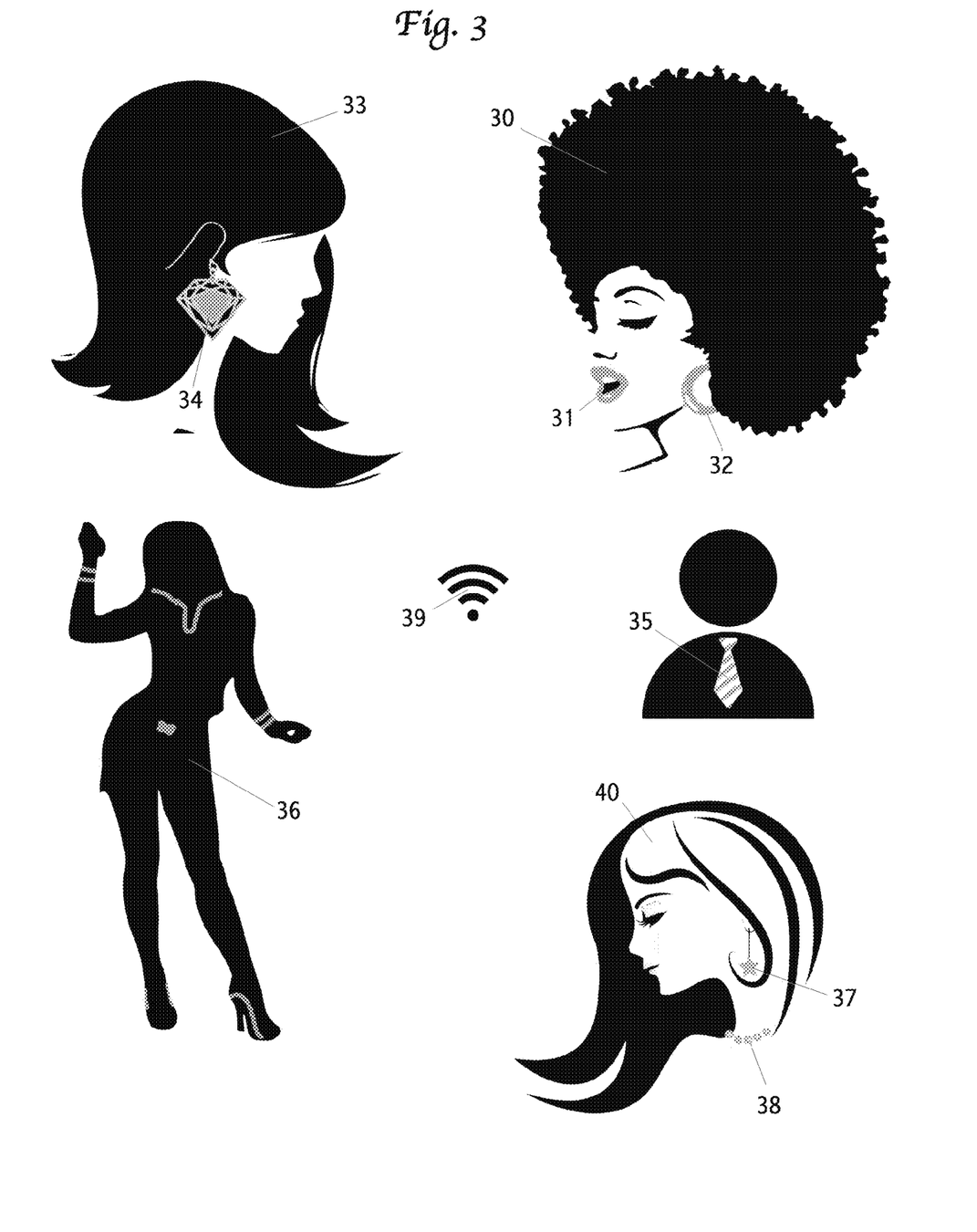
FIG. 3 shows a different communication groups and embodiments of use.

Turning now to FIG. 3, we exemplary people 33, 30, 36, 35 and 40 in a shared social setting. In one embodiment, a user may wish for her fashion accessories to operate synchronized. For example, in 36 we see that her bracelets, necklace, belt buckle and shoes are all participating within one group to display green. They may also flash simultaneously or in a coordinated, that is, synchronized, sequence. In another embodiment, two friends may wish their fashion accessories to belong to the same group so that they will share an experience, and also which others may see. For example, women 33 and 30 both have earrings 34 and 32 that currently display teal. Note the woman 30 is wearing teal lipstick. The lipstick itself is likely not electronic and has a fixed color. Woman 30 has chosen teal as a display color for her earrings to match her passive lipstick color. We also see a man with a tie 35 that displays teal stripes. The earrings 32 and 34, and the tie 35, all belong to the same electronic group; that is, they have the same Group IDs (GID). Fashion accessories communicate locally wirelessly, as indicated by icon 39.

FIG. 3 also shows an embodiment of a woman 40 who is wearing violet eye shadow. She has chosen the color violet for her fashion accessories to match her eye shadow. Participating fashion accessories include an earring 37 and a necklace 38. Here, the earring 37 display a steady color while the beads in her necklace 38 turn on in a sequence to create a moving appearance around her neck.

FIGS. 4A-4D and FIG. 5 show embodiments of state diagrams that may be used to control operation of synchronized fashion accessories. All of these state diagrams are specifically claimed, in any combination, included similar or equivalent state diagrams, where "equivalent" is defined by the patent equivalence doctrine. A key goal of embodiments is easy-of-use for wearers, without needing to manually enable, configure or program any fashion accessories. Ideally, they then function, reasonably, such as an exemplary user would wish. In particular, they should "turn on" and "turn off" automatically, at reasonable times, based either on messages from a controller or peer-to-peer messages. We use some terminology, as follows. A STANDBY state is a low power or very-low power state where the device is able to detect a state change input, such as motion, but does not generate light or otherwise expend power such as transmitting. In an OPERATE state, a device is able to receive wireless commands and also detect state change inputs. A SLAVE device, or a SLAVE operating mode is a listen-only mode, that typically receives wireless commands, comprising a Group ID (GID). The SLAVE device, if in an OPERATE state, then responds to those commands, such as by generating light, synchronously. A MASTER device is able to wirelessly transmit commands, usually comprising a GID, to SLAVE devices. Some MASTER devices are able to also operate as SLAVEs. In some embodiments, no GID is used; slave devices respond to all properly received local wireless commands from a MASTER.

The purpose of a Group ID (GID) is to permit one group of synchronized illuminated fashion accessories (i.e., "devices,") to operate separately from another group, even if their wireless communication ranges overlap. This might occur on a dance floor, for example. A GID may be a number. It might be a number in a large number space, such as a 64-bit space. It may be a number in a small number space, such as a 4-bit or 8-bit space. It may be generated, when needed, randomly or arbitrarily. Alternatively, it may be programmed into a device at a factory, distributor or retailer. Alternatively, another device such as a smart phone, smart watch app, or camera, may be used to program a GID, typically via a wireless interface. For simplicity, in one embodiment, SLAVE devices listen and then store the first GID they receive, either prior to first use, or after a suitable delay, such a one day, one week, or one month.

Figure 4A:
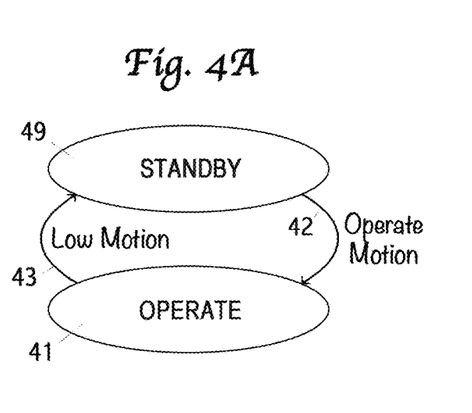
FIGS. 4A-4D show exemplary operating mode state diagrams.

We continue with exemplary state diagrams in FIGS. 4A-4D and FIG. 5. FIG. 4A shows a particularly basic embodiment. State 49, STANDBY, does not generate light not synchronize with other devices. It is a low-power or very low power state, whose primary purpose is to listen to detect and respond to a "wake up" or "operate" input to cause a state change to OPERATE, 41, state. One exemplary input is to detect motion, such as manually removing a jewelry item from a jewelry box, or putting on a fashion accessory, such as a bracelet, belt, scarf, or shoes. Another exemplary "wakeup" input is detection of a suitable wireless message. The state change 42 is labeled in FIG. 4A as "Operate Motion;" that is but one exemplary input to cause a state change from 49 to 41. Such state change input 42 using any combination of light, temperature, shaking, taps, clasp operation, or other motion is specifically claimed. State change input 43 to change from OPERATE 41 to STANDBY 49 may similarly respond to a variety of inputs. One such exemplary input is low or zero motion, such as might correspond to stopping dancing, or removing the fashion accessory, for some minimum period of time, such as 30 seconds, or 5 to 180 seconds. The state diagram of FIG. 4A may operate as a standalone state diagram, or may be incorporated into other state diagrams and state operation.

Figure 4B:
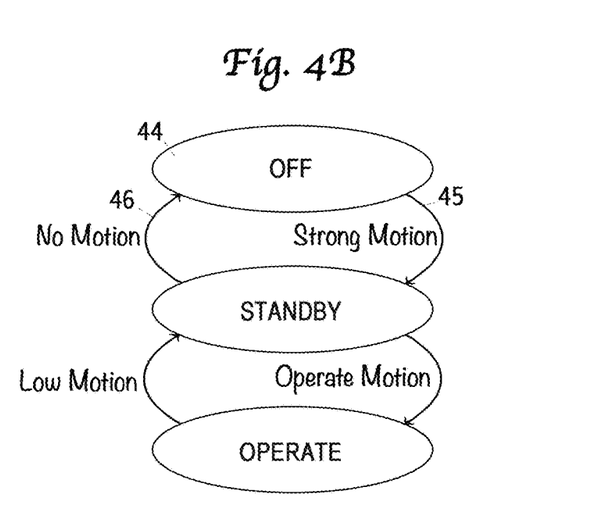

FIG. 4B shows a slightly more complex or comprehensive state diagram. Here the states STANDBY and OPERATE are similar to those described above. Another state, OFF 44 is defined. Such an OFF state may be suitable for shipping, storage and a state prior to being sold or used the first time. In this state, there should be no power used, or very low power. In one embodiment a strong motion, such a shaking, for a minimum time period 45, may be used to change from the OFF 44 state to a STANDBY state. A change 46 from a STANDBY state to an OFF state 44 may be implemented with a variety of inputs, such as no motion for a minimum time period, or no light for a minimum time period, or no operation (OPERATING state) for a minimum time period. State change 46 may also be in response to an appropriate received wireless command. In one embodiment, there is no automatic state transition 46 from STANDBY to OFF 44 except by removing a battery, manufacturing, retailing, or similar manual effect.

Figure 4C:
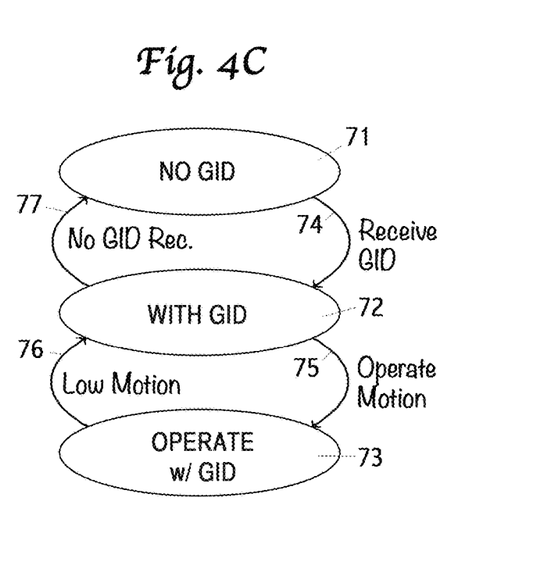

Turning now to FIG. 4C we see one embodiment of another state diagram showing how a SLAVE device may receive and then remember a Group ID (GID). In state 71, "NO GID," a device, either a SLAVE or potential MASTER, does not have a usable GID. It receives a GID 74 via wireless communication. It then saves this GID in state 72, "WITH GID." Once a state change input has been received, 75, such as motion detection, the device is able to operate using that GID, state 73. When a condition to stop operation is received, such as low motion or no motion, no wireless commands received for a time period, or darkness, the device changes to a STANDBY state 72, but maintains the GID it has learned in event 74. Such storage may be effectively permanent (while still subject a master reset), or may last for a time period, such as one minute to eight weeks. State change input 77 may never occur. FIG. 4C may apply to both SLAVE and MASTER devices.

Figure 4D:
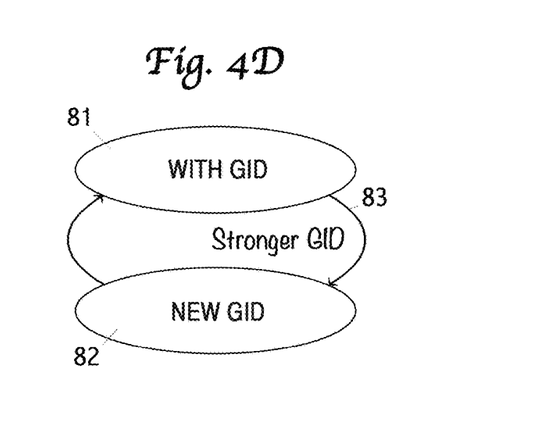

FIG. 4D shows an embodiment where a GID may be changed, or initially set up, by comparing wireless signal strengths. Here, a device with a GID in state 81 (similar to state 72 in FIG. 4C) may compare signal strengths from two MASTERS, both transmitting, using different GIDs. The GID in the stronger signal may then be stored in state 82, which transitions automatically back to state 81, now using the new GID. This embodiment allows SLAVE devices to be programmed with an initial or new GID by simply being placed adjacent, next to, or close to a transmitting MASTER.

Figure 5:
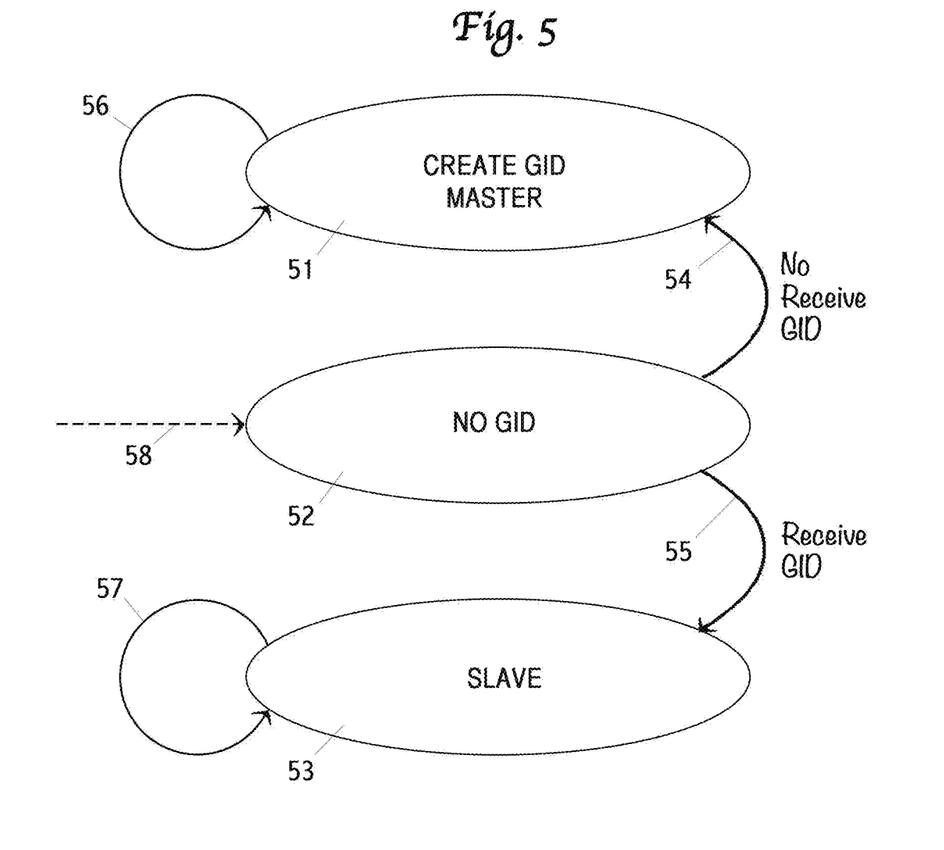
FIG. 5 shows another exemplary operating mode state diagram.

Turning now to FIG. 5, we see an embodiment where a potential MASTER device creates a new GID. Starting in state 52 the device has no internal GID. If it receives one, transition 55, it uses that GID and operates as a SLAVE, state 53. Barring a reset condition, it remains a SLAVE with this Group ID, shown by loop 57. This state may incorporate, for example, states 72 and 73 in FIG. 4C. If the device does not receive a GID for some time period, transition 54, it creates a new, or uses its own GID, to operate as a MASTER, state 51. It continues to operate as a MASTER device, until reset, as shown by loop 56. A reset condition is shown by dotted line 58. Such a reset may be a master reset or a factory reset. It may be a result of changing a battery. Alternative master reset conditions may include: a long non-operating time interval; vigorous shaking; repeated tapping, operating a button on the device; receiving a wireless master reset command; refrigeration temperature; and the like.

More sophisticated operations may be set by a user using an app, such as on a smart phone, smart watch or camera. Operation may also be easily controlled by using light, temperature, or motion such as one or more taps or shaking. Taps are particularly easy to both perform and to automatically detect. A number of sequential taps, such one, two, three, four, five or more, may be used to implement functions, including on/off, select program, enter or exit a master reset state, change GID, and the like. Selection of operation or state changes using any combination of light, temperature, shaking, taps, or other motion is specifically claimed. Measuring or detecting temperature on or near a surface of a device may be proxy for body temperature. Changes to temperature may be used as a proxy for entering or leaving a building or vehicle. This may be used to both detect that the device is now being worn or that the wearer is active. Such information may be used for state changes such as shown in state diagrams. A signal strength of received wireless input may have to be received at least a minimum time period to respond to programming or reset sequences.

Such a time period might be in the range of one second to 30 seconds. This capability makes "hacking" more difficult.

Sensors for synchronized illuminated fashion accessories should, in general, be small, very low power, low cost, and rugged. Suitable detected conditions include temperature, light, motion, sound, and wireless messages. Motion sensors, such as solid state accelerometers, are particularly suitable for embodiments. Detecting different types of motion, such as starting to wear, walking, or dancing, is easy to implement. Detecting "taps" as a unique motion is particularly easy and suitable for embodiments. Some accelerometers are very low power and may be used to wake up an embedded processor when a particular type of motion is received. "Sound" may include sounds in human audible frequency ranges, or sub-audio, or ultrasonic frequencies. "Sound" may also include recognition of speech or music.

An alternative embodiment for programming, receiving GIDs, and implementing reset may be the use of a sufficiently bright or modulated light. For example, a synchronized fashion accessory may be placed on another, or on a device with a display such as a smart phone or smart watch. The close proximity then provides sufficient illumination brightness.

Synchronized illuminate fashion accessories are typically powered by a battery, which may be removable or rechargeable. Charging may be via motion, light, or a conventional cable.

"Synchronization" may comprise a wide range of operations, but typically means operating in a coordinated fashion among SLAVE devices (and optionally one or more MASTER devices) that receive wireless commands with the same GID. The SLAVE devices do not need to coordinate among themselves, except in peer-to-peer operating modes. Simply responding to received wireless commands from a MASTER is generally sufficient to implement apparent synchronization.

In yet other embodiments, peer-to-peer communication may be used in place of a specific MASTER. Note that in such embodiment, participating devices must generally include some transmit capability. Broadcast transmissions are generally preferred over addressed, point-to-point communications, although covered and claimed embodiments are possible using point-to-point communication.

Suitable time periods for an interval between consecutive taps, for tap detection are the range of 0.25 seconds to five seconds, or the range of 0.5 seconds to three seconds. Suitable transitions from a STANDBY state to an OPERATE state, such as transitions 42 in FIG. 4A, include a minimum length of time of motion detection, a minimum amplitude of motion, a type of motion (e.g., wearing, tapping, walking, or dancing), in any combination. Suitable time periods for a minimum length of time are in the range of one second to 180 seconds, or the range of five seconds to 120 seconds, or in the range of 10 seconds to 60 seconds. Suitable time periods for a minimum length of time to transition from OPERATE to STANDBY, such as transition 43 in FIG. 4A, are in the range of one minute to 60 minutes, or the range of three minutes to 30 minutes, or in the range of five minutes to 15 minutes. Suitable time periods for receiving a valid GID for a transition such as 74 in FIG. 4C, or transition 83 in FIG. 4D, are in the range of 0.1 seconds to 60 seconds, or the range of 0.5 seconds to 15 seconds, or in the range of one second to 10 seconds.

One method of determining appropriate motion strengths is to ask a group of potential wearers to perform certain operations, such as putting on such synchronized illuminated fashion accessories, taking them off, dancing, and the like. Then, one examines the nature, strength and duration of parameters such motion, temperature, and sound to determine practical ranges for such parameters to be used, such as in transitions between operating states. The goal is that inexperienced, untrained wearers can easily use and understand the expected operation of such devices.

Figure 6:
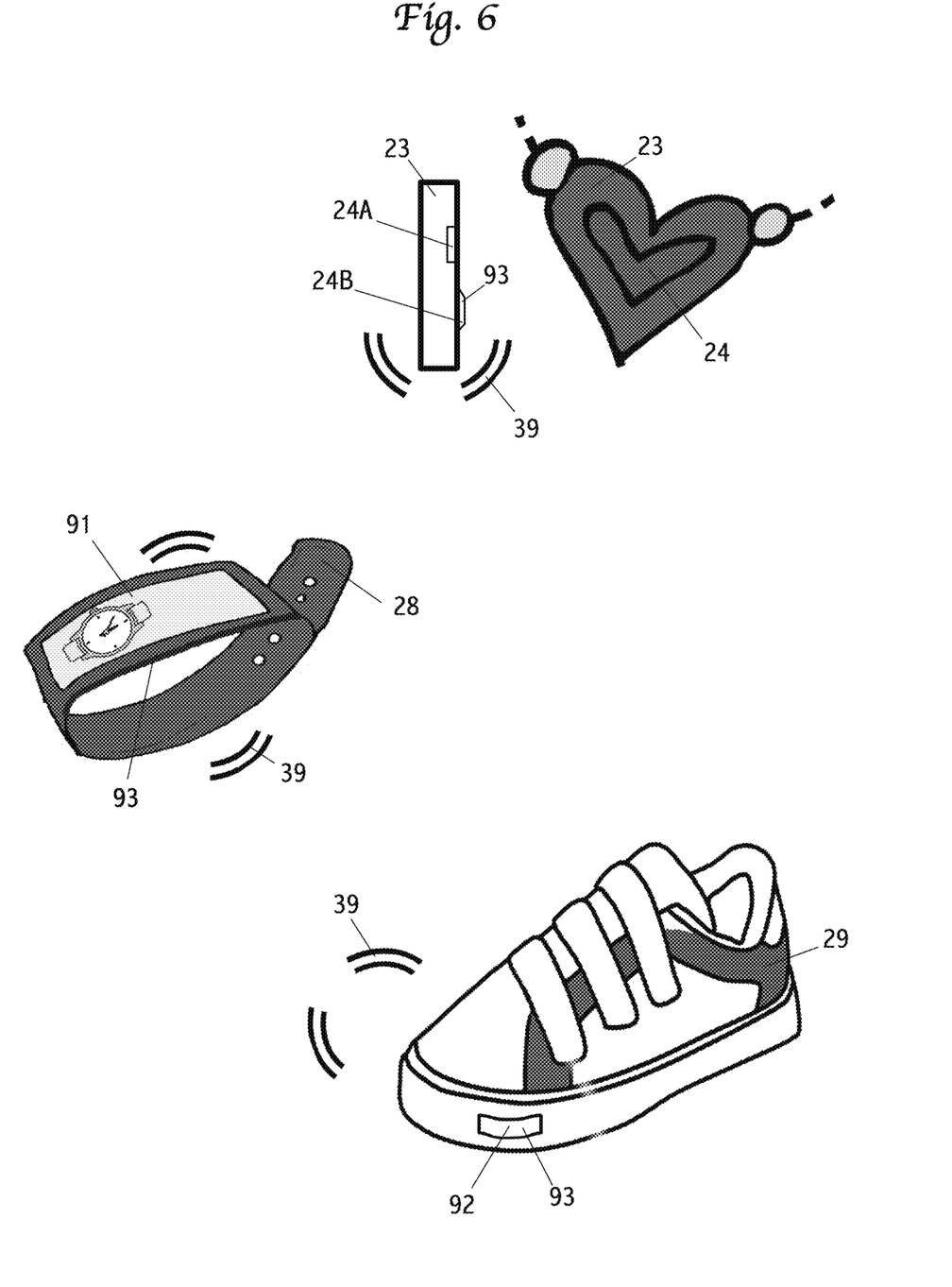
FIG. 6 shows exemplary locations of controllers.

Turning now to FIG. 6, we see again, from FIG. 2, three fashion accessories, a portion of a bracelet 23, an electronic watch 28, and a shoe 29 with an illuminated strip. A side view of a portion of bracelet 23 is also shown, with 24A and 24B as two embodiments of a controller, either "in" 24A, or on or proximal 24B. 93 is an embodiment location of sensors. 39 shows wireless communication. An electronic watch is shown 28, with a controller as part of the internal electronics 91 and sensors proximal to skin 93, 39 shows wireless communication. A shoe 29 is shown with a controller 92 and sensors 93, 39 shows wireless communication.

Figure 7:
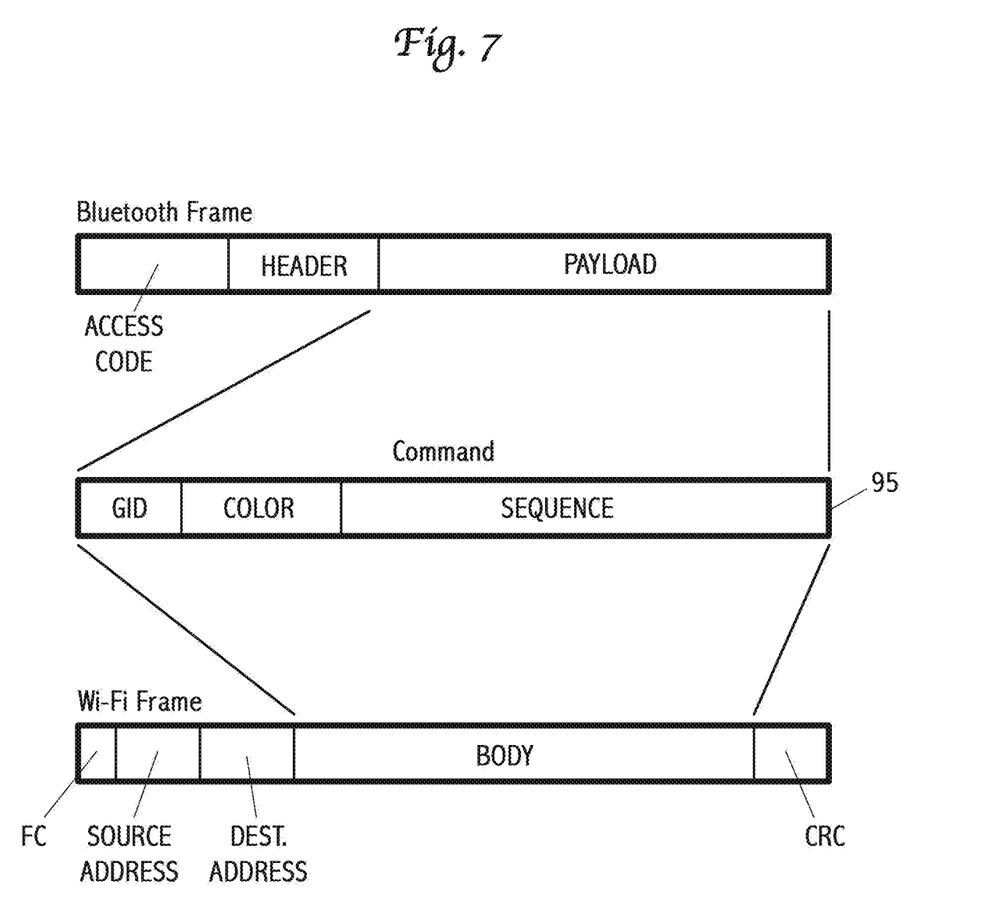
FIG. 7 shows an exemplary command structure.

Turning now to FIG. 7, we see an exemplary command structure along with a diagram showing where in common protocol frames such a command would be placed. FIG. 7 shows both a generic Bluetooth frame at the top and generic Wi-Fi frame at the bottom. These two frame structures are directly from international Standards (IEEE 802.11, IEEE 802.15 for example).

Continuing with FIG. 7, we see an exemplary packet or command structure in the middle of the Figure, 95. Three exemplary fields are shown: Group ID (GID), color and sequence.

Yet more embodiments for states and state changes are described below.

One embodiment includes specifics for fashion accessories with communicating electronics to associate with a Group ID (GID). Fashion accessories with the same Group ID will synchronize. Ideally, in such an embodiment, fashion accessories would join a group automatically. In most cases, synchronized fashion accessories will be owned and worn only by the same person. In such case, it is more important that devices know when to turn on and off, than it is for them to be able to easily change their group.

A fashion accessory may operate or comprise as more than one slave device. A fashion accessory may be configured or adapted to operate as both a master and a slave.

Exemplary sources of synchronization detected, selected, or created by a master may comprise, as non-limiting examples: (1) selected by controller automatically; (2) selected by wearer; (3) selected by another user; (4) responsive to music; (5) responsive to mood of wearer; (6) responsive to motion of wearer; (7) responsive to received light; (8) responsive to a camera image; (9) responsive to a user manually selecting one or more colors from a digital image; (10) selected by receiving device; or (11) any combination of the above.

Exemplary usage scenarios and methods of operation comprise, as non-limiting examples: (1) single wearer; (2) wearer's mood per sensor; (3) wearer's motion; (4) ambient light; or (5) group of wearers.

In some embodiments, motion sensing is core to setting a Group ID, and also changing state to or from STANDBY automatically. When a synchronizable fashion accessory is first sold, it is in a "master reset" or "factory reset" condition, with no stored default Group ID. Then, after purchase, it enters a "learn" mode, where it is able to detect a Group ID transmitted by other, nearby, fashion accessories or local controller. It then adopts that Group ID and uses it as its own default. In one embodiment, to cause a fashion accessory to forget its current Group ID and learn a new one, it must be put back into a "factory reset" state. If a MASTER fashion accessory is in learn mode, and it does not detect a transmitted Group ID from another fashion accessory, it will create its own, new, Group ID and start transmitting that just-created Group ID.

Of course, mechanical or touch-sense button can be used to manually instruct fashion accessories to change state. A single button easily handles multiple state change, such as by short touches, long touches, a sequence of touches, pressure, swipes, and the like. Buttons are easily made invisible or nearly invisible. For example, touch sensing may be used. A mechanical or other button may be placed behind a flexible or movable surface, such as silicone. A button may effectively be hidden in a clasp. In that way, putting on an accessory, such as a bracelet, necklace, shoes, and the like, initiates a change from a STANDBY state to an OPERATE state. Similarly, removing the item puts it into STANDBY state without having to wait a minimum time period or detect some specific motion.

A key goal of embodiments is ease of use for the wearer, and in some embodiments, nearby friends of the wearer. Claims and other parts of this disclosure should be construed and interpreted in this light. Claims are directed to all of: sets, individual devices, and methods of operation, including programming, state diagram execution, and operation when worn. Claims are made to any single or designed fashion accessory set (such as earrings, shoes, or multi-part bracelets or necklaces) that are adapted to be any element of a set that is claimed, or adapted to execute methods claimed.

We can define a set of states for devices and conditions to change state. This provides a clear and comprehensive implementation for at least one embodiments. See also FIGS. 4A-4D and FIG. 5. As those in the art know, there are many alternative implementations that fall within claim scope. Exemplary states are discussed below.

(1) Factory Reset—this is the initial state, where no Group ID is known by the fashion accessory. Return to this state may be accomplished by removing batteries, pressing a button for a minimum amount of time (such as at least 0.5, 1.0, 3.0, 5.0, or 10.0 seconds); receiving an appropriate reset command from a control device, or by other reset actions. This state may also be called, "Master Reset," or "Initial State."

(2) Standby—this is the normal "off" or non-operating state for a fashion accessory, after it has been used at least once by a wearer. In this state, it knows at least one (e.g., "default") Group ID and has operates in a low power operating mode where it can detect some inputs, such as motion or a received message, where these inputs then change its state to "Operating." In Standby state the fashion accessory does not provide illumination. It may be stored by the wearer in a dresser or jewel box, for example, or worn discreetly in an office. Entering this state from an Operating state may be by detecting lack of motion for a minimum amount of time (such as 10, 30, 45, 60, 120, 180, or 240 seconds); or lack of commands from a controller for a minimum amount of time (such as 10, 30, 45, 60, 120, 180, or 240 seconds); by another method, such a touching or holding a button on the fashion accessory; or by receiving an appropriate command from a controller.

(3) Operating by Wearer—In this state, the fashion accessory receives commands comprising its default or current Group ID from a controller and executes those commands, up to its hardware limits. This state may be entered by detecting a minimum amount of motion, where this minimum amount of motion is comparable to putting on and then wearing the fashion accessory for a minimum amount of time (such as at least 5, 10, 15, 30, 45, 60, 90, 120, or 240 seconds). This state may also be entered by received a command with a minimum amount of received power (comparable to having the controller a short distance away, such as within 3, 5, 7, 12, 18, 36, or 72 inches) for a minimum amount of time (such as 1, 2, 3, 5, 10, 15, 30, 45, 60 or 120 seconds). The goal is for devices to automatically enter the Operating state by a wearer state simply by a wearer getting dressed and putting on fashion accessories, including a controller (such as a smart phone, smart watch, or other so capable fashion accessory such as shoes or a purse.) A controller fashion accessory may also operate as a SLAVE fashion accessory. Mild shaking may cause a fashion accessory to change from Standby to Operating state. Note that if no default Group ID is known by a fashion accessary, it may adopt the first one it receives from a controller for a minimum period of time with a minimum received power level.

The above three states are sufficient for one embodiment of slave-only (not a controller), particularly one that does not support a "Friend" mode or state, or Controller capability.

(4) Receiving from a Friend—This mode allows two friends to synchronize their fashion accessories together. For example, two friends dancing, traveling through a crowd, or exercising together. Entering this state may be accomplished by appropriately receiving another (non-default) Group ID from. This state may be entered by received a command from another controller with new, such as non-default, Group ID, with a minimum amount of received power (comparable to having the controller a short distance away, such as within 3, 5, 7, 12, 18, 36, or 72 inches) for a minimum amount of time (such as 1, 2, 3, 5, 10, 15, 30, 45, 60 or 120 seconds). The goal is for fashion accessories between two or more friends to synchronize when they are particularly close to each other. For example, a smart watch of one wearer may be placed next to a fashion accessory of a friend. If commands from the other controller are not received for a minimum amount of time, then the state reverts to Operating by wearer state or Standby state. States may also be changed by appropriate commands from the default Group ID controller, or by touching a button for a minimum amount time, such as example times given above.

Note that synchronizing from a friend's fashion accessories to a wearer's fashion accessories does not require the friend's controller to know. The wearer's fashion accessories simply listen to the broadcasts from the friend's controller.

(5) Controller—In this mode or state, a fashion accessory selects colors and/or sequences for other fashion accessories and broadcasts respective commands for execution by slave fashion accessories. This state may be entered automatically by some devices when the exit Standby state, or by a specific action such by a wearer, such as activating or within an app on a smart phone or smart watch. A button may be used to enter this state. Slave-only fashion accessories cannot become Controllers.

More states and more complex changing of states is possible in other embodiments.

One embodiment selects a color or colors to displayed synchronously by simple wearer selection. This might be from a predetermined palette, for example. Or, by a wearer selecting a color from an image file or from real-time video or still images. For example, a wearer might take a video or still of her fingernails, then select the fingernail polish color as a color to be used by the synchronized fashion accessories. Selection of one or more colors from an image may be automatic, not involving manual operation of a wearer. A video, still, or creative image may be received from a friend or other source other than the wearer.

A wearer's mood, time of day, day of week, temperature, ambient lighting, amount of motion, or skin sensors may be used to set or select a color or illumination sequence. A skin sensor may be a suitable analog or proxy for mood. Skin sensor may comprise, for non-limiting examples: skin temperature, skin saltiness, skin pH, heart rate, breathing rate, blood oxygen saturation, and rate-of-change of such examples. Local sensors that may be used to select color or a sequence also include: ambient light brightness; ambient light color; ambient noise timing, ambient noise volume, ambient noise type, ambient temperature, time of day, day of week, and the like. For example, loud music and strobe lighting may indicate a dance venue. An illumination pattern responsive to the music beat may then be selected by a fashion accessory. "Mood" should be construed to include such user attributes, user location, time and date, and proxies.

Slave fashion accessories should make a "best effort" to follow instructions from a master fashion accessories. Not all fashion accessories may be capable of displaying all colors or implementing all sequences.

Fashion accessories that are capable (adapted) to function as a controller generally should also function as a slave.

Another embodiment may use a sequence of state changes described below.

1) Factory Reset state—this is the state from the factory, and also may be reset by a user.
2) Once the Factory Reset state is exited, such as by movement, shaking, or other action, listen for a transmission from a current master transmission.
3) If a transmission from a current master is received, adopt that Group ID and become slave by changing to Operating by Wearer state.
4) If no transmission from a controller is received during a predetermined interval, select a Group ID, enter the Controller state, and start transmitting as a controller.
5) If a Group ID has been previously used, within a predetermined time, that Group ID is again used for step 4) above.
6) If no Group ID has been previously used, within a predetermined time, select a new Group ID that is ideally unique. It may be a serial number, random number, pseudo-random number, factory assigned number, IP address, and the like, for step 4 above.
7) Optional: If a transmission from another master is received, and the power received for that received transmission is above a predetermined power level, then adopt that Group ID and switch to slave mode.
8) If a power down input is detected, enter power down and go to step 4) above.

In some embodiments, a new default Group ID is determined for each fashion accessory following exist from a Factory Reset state.

(a) Turning power on (e.g., install batteries or touch a button); or
(b) No motion for a while (e.g., minutes or hours or days); or
(c) Cold—refrigerator for a time period (minutes—hours); or
(d) Nearby magnet; or
(e) Very close proximity (field strength, IR, magnetic field); or
(f) New Group ID transmitted by one or more other devices for a time period; or
(g) Shaking; or
(h) No motion for a period of time (e.g., minutes or hours or days); or
(i) Use of a switch, touch or mechanical; or
(j) Detection of a ferrous material nearby; or
(k) Connected to charging source.
(l) Detects taps on a hard surface, one or more, within a predetermined time period.

More than one of the above state change actions may be required.

Messages transmitted, such as broadcast, by a MASTER may comprise as little as an appropriate header bit. This simplicity allows short messages, such as beacon, query or status messages, to be used to control synchronized illuminated fashion accessories. The transmission itself, and receipt by a SLAVE, then comprises a suitable synchronization signal. A message may comprise a color, using a proprietary or standardized encodings for colors, such as 8-bit RGB values. A message may comprise a Group ID number. A message may comprise a time value which may be used as a delay, from receipt of the message, a start time, or as a directed time spacing of illumination outputs. A message may further comprise a sequence or display code that indicates to suitably equipped or configured receiving fashion accessory a particular sequence of output, such colors or timing. A message may comprise a set, sequence or list of colors. A message comprise an image, such as a camera image (photo or creative). A message my comprise programming or configuration parameters. A message may comprise a source address or identifier or a destination address or identifier, although use of these is not preferred. A message may comprise a manufacturer's code, type, or model(s). A message may include status information about the transmitting MASTER. A message may comprise a sequential message number. A message may comprise a checksum or other data to assure accurate reception of data; such a checksum is preferred and is part of many standardized message protocols. A message may be encrypted or signed, although such use is not preferred.

If a fashion accessory is receiving from more than one controller, it may choose the one with the highest received signal strength. Such a controller may or may not be broadcasting with the default Group ID. If not broadcasting a default Group ID, the slave fashion accessory may then temporarily adopt that Group ID as a "Friend Group ID." Such embodiments comprising a friend (of the primary wearer), and devices worn by the friend, both individual devices and set of devices, are specifically claimed.

If a controller-capable fashion accessory has no Group ID, or is in Master Reset state, and no other Group ID from another controller (for a minimum amount of time at a minimum received power level) is received, then in one embodiment it may begin broadcasting one.

"Locking" may be used to keep a default Group ID from easily changing. This keeps devices from accidentally taking on the Group ID of other people, for example, being by a close person or on a crowded dance floor or classroom.

In yet another embodiment, a fashion accessory may store and use more than one Group ID. A command may be broadcast where not all receiving devices with the same Group ID are able to execute the entire command. For example, some devices may be able to blink, or turn on multiple lights in a sequence, while other devices may display only a single color from a single color emitter. Nonetheless, we refer to these devices as being in the same group.

In some embodiments, encryption of messages may be used. In some embodiments, a Group ID may be, or may be derived from an IPv4 or IPv6 address; or a SIM number, or a random or pseudo-random number.

Otherwise unused bits in header fields of messages may be used for time synchronization. This permits master to device to send a usable signal, such as to a beat of music, without establishing a normal point-to-point connection or optionally a normal broadcast, according to standard protocols for a used wireless protocol. For example, a "beacon" transmission may also then be used to send a beat.

Wearers may select from a wide range of colors and sequences from a stored image or video or a live image or video. A wearer may use her finger on a screen to identify a desired color. Semi-automatic color or sequences may be chosen by having an app select from an image or image code. This allows, for example, a wearer to simply point a smart phone camera at a color or scan code (e.g., a QR code) to have that color or sequence display from her currently worn fashion accessories.

Devices may also produce a sound, which is also synchronized among multiple fashion accessories. Sounds may a tap, for example, from a shoe, to simulate tap dancing. As another example, earrings may make a pleasant sound. As another example, fashion accessories may play music, podcasts, or operate similarly to a phone. Use of sound as a synchronized output of fashion accessories, both individually and as sets, is specifically claimed. Such claims are not negated by the use of "illuminated" in titles, abstracts, drawings and text.

Two different wireless protocols may be used. For example, a controller may be programmed with a higher-power protocol, such as Wi-Fi or cellular. A second, lower-power protocol may be used from controllers to slaves, such as Bluetooth LE or spread-spectrum. Devices may communicate on the internet. Social media pages or message may comprise information used by illuminated fashion accessories. Such embodiments may be used to synchronize or harmonize the operation of illuminated fashion accessories among multiple wearers.

In yet another embodiment, a wearer may be an animal, such as a pet or livestock. In yet another embodiment, a wearer may be a personal item, such as a bicycle, helmet, or exercise or sports equipment, food service equipment, or a work surface or restaurant table.

Definitions

"Change color"—also include on/off, brightness, flashing, stead-state, and time-sequencing.

"Command"—may include more than one linked or related command.

"Device"—another name for a fashion accessory or personal care item, suitably equipped to implement any claim, example, scenario or figure of any embodiment.

"Fashion accessories"—include but is not limited to wearables such as shoes, sandals, boots, slippers, bracelets, necklaces, hair accessories, rings, watches, writing implements, device cases, broaches, buttons, earrings, belts, belt buckles, hats, gloves, purses, clutches, backpacks, glasses, bows, piercings, ankle bracelets in any combination. Fashion accessories may include personal care products such as a lipstick applicator, personal mirror, eye-shadow applicator, toothbrush, hairbrush, glasses case, hearing aids, music players, GPS devices, cell phones, and the like. Device cases may include cellular phone cases, for example, or glasses cases. Hair accessories include hair pins, hair clips, scrunchies, tierras, crowns, hair bows, headbands, rhinestones, bobby pins, caps, hats, hair ornaments, hair figurines, and the like. All combinations of devices, items and fashion accessories in this paragraph are specifically claimed as fashion accessories.

"Friend"—a person wearing a fashion accessory who is not the current wearer.

"Local"—refers to a practical range of low power wireless communication. Local also refers to a practical volume on or proximal (adjacent, next to, within reach) to a wearer. Local may use a protocol such as Wi-Fi, infrared or ultra-violet, or sonic (e.g., audible, sub-sonic, ultrasonic), as examples.

"Meta-sequence"—a sequence of sequences, or a set of sequences. The term "sequence" also include meta-sequences.

"Mood"—has its conventional definition and also includes human physiological states. It may also comprise or consist of automatic detection by an electronic sensor of a physiological attribute of a person, such as skin temperature, skin moisture, skin pH, heart rate, motion, and the like. Construction of claims may include construction of the word "mood" to be such measured physiological attributes. A non-limiting list of moods includes: abused; aggressive; aloof; angry; annoyed; anxious; attentive; awake; bored; busy; buying; caring; caring; cautions; cold; concerned; confident; confused; contents; crazy; curious; determined; devious; directing; disappointed; distressed; distrustful; dreamy; drunk; eager; ecstatic; elegant; embarrassed; evil; exasperated; excited; exhausted; expecting; experimenting; explaining; failed; faint; fierce; friendly; frustrated; fun; generous; goofy; grateful; guilty; high; hostile; hot; hurt; idyllic; impatient; impressed; in trouble; inferior; innocent; insulted; jealous; mean; modest; moody; naïve; needy; nervous; noisy; obedient; observant; overwhelmed; panicky; panting; part of a group; passive; patient; patient; peaceful; pensive; pissed off; playful; pleased; posing; pouty; powerful; premature; proud; quiet; quiet; ready; relaxed; relieved; ripe; rude; sad; satisfied; scared; seductive; selling; shocked; showing off; shy; sleepy; stern; stoned; stressed; successful; superior; surprised; suspicious; sweaty; teased; tense; ticklish; trustful; uncaring; uncertain; unfriendly; unhappy; unsure; upset; waiting; warm; weak; working hard; and worried. Wearers may have more than one mood or physiological attribute at the same time.

"Proximal"—with respect to the closeness of one wearer to another wearer, or the closeness of one fashion accessory to another on the same wearer, typically means, including for claim construction, "for the purpose intended." In practice, it may mean within reliable communication range or a transmitting device in a set or with the same Group ID. It is a reasonable interpretation that for two or more proximal wearers, that they can, at least part of the time, see each other or could see each other if desired. "Local" is another name for proximal. Wireless signal strength, or signal direction, may be a proxy, or one of a plurality of determining factors, for, "local."

"Remote"—refers to a distance longer than local. Remote communication may include Wi-Fi, cellular, and the like.

"Sequence"—may include more than one sequence or pattern, such as a super-sequence or meta-sequence.

"Wearer"—a person wearing a fashion accessory. Another name is "user." The terms "wearer" and "worn" should be construed broadly.

"Wireless protocol"—includes protocols but is not limited to Wi-Fi, Bluetooth, Bluetooth LE, spread spectrum, sub-sonic, ultrasonic, infrared, and cellular radio.

Ideal, Ideally, Optimal and Preferred—Use of the words, "ideal," "ideally," "optimum," "optimum," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.

All examples are sample or exemplary embodiments. In particular, the phrase "invention" should be interpreted under all conditions to mean, "an embodiment of this invention." Examples, scenarios, and drawings are non-limiting. The only limitations of this invention are in the claims.

May, Could, Option, Mode, Alternative and Feature use of the words, "may," "could," "option," "optional," "mode," "alternative," "typical," "ideal," and "feature," when used in the context of describing this invention, refer specifically to various embodiments of this invention. Described benefits refer only to those embodiments that provide that benefit. All descriptions herein are non-limiting, as one trained in the art appreciates.

Embodiments of this invention explicitly include all combinations and sub-combinations of all features, elements and limitations of all claims. Embodiments of this invention explicitly include all combinations and sub-combinations of all features, elements, examples, embodiments, tables, values, ranges, and drawings in the specification and drawings. Embodiments of this invention explicitly include devices and systems to implement any combination of all methods described in the claims, specification, abstract, and drawings. Embodiments of the methods of invention explicitly include all combinations of dependent method claim steps, in any functional order. Embodiments of the methods of invention explicitly include, when referencing any device claim or limitation thereof, to any and all other device claims, including all combinations of elements in device claims. Claims for devices and systems may be restricted to perform only the methods of embodiments or claims.

I claim:

1. A set of fashion accessories comprising:
a plurality of fashion accessories, each fashion accessory comprising at least one region of emitting variable color light, wherein the plurality of fashion accessories are adapted to be worn by a single wearer at the same time;
a local fashion accessory controller;
wherein the local fashion accessory controller is adapted to send local wireless commands to the plurality of fashion accessories;
wherein the local wireless commands comprise one or more display colors;
wherein each of the plurality of fashion accessories is adapted to receive the local wireless commands;
wherein each of the plurality of fashion accessories is adapted to change the color of its at least one region of emitting variable color light responsive to the received local wireless commands and in synchronization with all other of the plurality of fashion accessories.

2. The set of fashion accessories of claim 1 wherein:
the plurality of fashion accessories comprises two or more elements from the list, in any combination: shoes, sandals, boots, slippers, bracelets, necklaces, hair accessories, rings, watches, writing implements, device cases, broaches, buttons, earrings, belts, belt buckles, hats, gloves, purses, clutches, backpacks, glasses, bows, piercings, ankle bracelets, lipstick applicator, personal mirror, eye-shadow applicator, toothbrush, hairbrush, glasses case, hearing aids, music players, GPS devices, cell phones, cellular phone cases, glasses cases, hair pins, hair clips, scrunchies, tierras, crowns, hair bows, headbands, rhinestones, bobby pins, caps, hats, hair ornaments, and hair figurines.

3. The set of fashion accessories of claim 1 wherein:
the synchronization comprises each of the plurality of fashion accessories changing the color of its region of emitting variable color to match a color at least one other of the fashion accessories in the set.

4. The set of fashion accessories of claim 1 wherein:
the synchronization comprises each of the plurality of fashion accessories changing the brightness of its region of emitting variable color light time-synchronized with at least one other of the fashion accessories in the set.

5. The set of fashion accessories of claim 1 wherein:
the local wireless commands are responsive to a mood of a wearer of the plurality of fashion accessories as determined by a mood detection device worn by the wearer.

6. The set of fashion accessories of claim 1 wherein:
the local fashion accessory controller is in the possession of a local control person who is different than a wearer of the plurality of fashion accessories.

7. The set of fashion accessories of claim 1 further comprising:
a remote fashion accessory controller in the possession of a remote control person who is different than a wearer of the plurality of fashion accessories;
wherein the remote fashion accessory controller sends remote wireless commands to the local fashion accessory controller;
wherein the remote wireless commands are responsive to a human physiological state of the remote control person;
wherein a wireless protocol of the remote fashion accessory controller is different than the wireless protocol of the local fashion accessory controller.

8. The set of fashion accessories of claim 1 further comprising:
a remote fashion accessory controller in the possession of a remote control person who is different than a wearer of the plurality of fashion accessories;
wherein the remote fashion accessory controller sends remote wireless commands to the local fashion accessory controller;
wherein the remote wireless commands are responsive to relative distance between the remote fashion accessory controller and the local fashion accessory controller.

9. A set of fashion accessories comprising:
a plurality of fashion accessories, each fashion accessory comprising at least one region of emitting variable color light, wherein the plurality of fashion accessories are adapted to be worn by a single wearer at the same time;
wherein each of the plurality of fashion accessories is adapted to receive one or more local wireless color commands;
wherein at least two of the plurality of fashion accessories are adapted to transmit one or more local wireless color commands;
wherein each of the plurality of fashion accessories is adapted to change the color of its region of emitting variable color light responsive to the local received wireless commands;

wherein the emitted variable color light from each of the plurality of fashion accessories is synchronized between each of the plurality of fashion accessories;
wherein the set of fashion accessories comprises two or more fashion accessories controllers.

10. The set of fashion accessories of claim 9 wherein:
the plurality of fashion accessories comprises two or more elements from the list, in any combination: shoes, sandals, boots, slippers, bracelets, necklaces, hair accessories, rings, watches, writing implements, device cases, broaches, buttons, earrings, belts, belt buckles, hats, gloves, purses, clutches, backpacks, glasses, bows, piercings, ankle bracelets, lipstick applicator, personal mirror, eye-shadow applicator, toothbrush, hairbrush, glasses case, hearing aids, music players, GPS devices, cell phones, cellular phone cases, glasses cases, hair pins, hair clips, scrunchies, tierras, crowns, hair bows, headbands, rhinestones, bobby pins, caps, hats, hair ornaments, and hair figurines.

11. A method of controlling an emitted color of light from the plurality of fashion accessories in claim 1 comprising the steps:
   (a) transmitting one or more color commands from a local fashion accessory controller to the plurality of fashion accessories;
   (b) receiving by the plurality of fashion accessories the one or more color commands;
   (c) displaying synchronized by the plurality of fashion accessories two or more variable colors.

12. The method of controlling an emitted color of light from the plurality of fashion accessories of claim 11;
   wherein the displaying synchronized comprises each of the plurality of fashion accessories emitting the same color at the same time.

13. The method of controlling an emitted color of light from the plurality of fashion accessories of claim 11;
   wherein the displaying synchronized comprises each of the plurality of fashion accessories emitting the same color at sequential times.

14. The method of controlling an emitted color of light from the plurality of fashion accessories of claim 11;
   wherein the transmitting one or more color commands from a local fashion accessory controller is responsive to a mood of a person.

15. The method of controlling an emitted color of light from the plurality of fashion accessories of claim 11;
   wherein the transmitting one or more color commands from a local fashion accessory controller is responsive to a mood of a wearer of the fashion accessories; and
   wherein the mood of the wearer is detected responsive to an automatic detection of one or more physiological attributes of the wearer.

16. The method of controlling an emitted color of light from the plurality of fashion accessories of claim 15;
   wherein the mood of the wearer is detected responsive to an automatic detection of one or more physiological attributes of the wearer; and
   wherein the automatic detection of one or more physiological attributes of the wearer is determined by a mood detection device worn by the wearer.

17. The method of controlling an emitted color of light from the plurality of fashion accessories of claim 11;
   wherein the transmitting one or more color commands from a local fashion accessory controller to the plurality of fashion accessories is response to receipt of a wireless command from a remote device; and
   wherein a protocol of the transmitting one or more color commands from the local fashion accessory controller is different than a protocol of the receipt of a wireless command from a remote device.

* * * * *